United States Patent
Berens et al.

(10) Patent No.: US 8,723,718 B2
(45) Date of Patent: May 13, 2014

(54) METHOD AND DEVICE FOR DETERMINING ASPECT ANGLE PROGRESSION

(75) Inventors: Patrick Berens, Hattingen (DE); Juergen Holzner, Wachtberg-Liessern (DE); Ulrich Gebhardt, Bruehl (DE)

(73) Assignee: EADS Deutschland GmbH, Ottobrunn (DE)

( * ) Notice: Subject to any disclaimer, the term of this patent is extended or adjusted under 35 U.S.C. 154(b) by 313 days.

(21) Appl. No.: 13/257,480

(22) PCT Filed: Mar. 17, 2010

(86) PCT No.: PCT/DE2010/000289
§ 371 (c)(1),
(2), (4) Date: Sep. 22, 2011

(87) PCT Pub. No.: WO2010/105605
PCT Pub. Date: Sep. 23, 2010

(65) Prior Publication Data
US 2012/0001796 A1    Jan. 5, 2012

(30) Foreign Application Priority Data
Mar. 18, 2009    (DE) .......................... 10 2009 013 768

(51) Int. Cl.
*G01S 13/90*    (2006.01)
(52) U.S. Cl.
CPC ..... *G01S 13/9035* (2013.01); *G01S 2013/9064* (2013.01)
USPC ....................................... 342/25 F; 342/25 B
(58) Field of Classification Search
CPC .............................................. G01S 2013/9064
USPC ....................................................... 342/25 F
See application file for complete search history.

(56) References Cited

U.S. PATENT DOCUMENTS

| | | | |
|---|---|---|---|
| 5,818,383 A * | 10/1998 | Stockburger et al. | 342/109 |
| 6,400,306 B1 * | 6/2002 | Nohara et al. | 342/25 R |
| 6,441,772 B1 * | 8/2002 | Hellsten et al. | 342/25 R |
| 7,456,780 B1 * | 11/2008 | Garren | 342/25 A |

FOREIGN PATENT DOCUMENTS

| | | |
|---|---|---|
| CA | 2 579 898 A1 | 8/2007 |
| DE | 10 2006 009 121 A1 | 8/2007 |
| EP | 0 550 073 A2 | 7/1993 |

OTHER PUBLICATIONS

P. Berens et al., "Motion Estimation for ISAR Imaging of Ground Moving Targets", EUSAR, May 2006, XP009136015 (Four (4) pages).
Shih-Ken Chen, "Developing a Forward Collision Warning System Simulation", Proceeding of IEEE Intelligent Vehicles Symposium, Oct. 3-5, 2000, pp. 338-343, XP010528960.

(Continued)

*Primary Examiner* — Matthew M Barker
(74) *Attorney, Agent, or Firm* — Crowell & Moring LLP

(57) ABSTRACT

A method and a device are provided for specifying, in the context of the image generation of ISAR processing, the determination of the aspect angle course subject to which the radar illuminates the vehicle during the exposure and subject to which the vehicle echoes are reflected back to the radar. Using the distance between the radar sensor and the vehicle as well as the change in distance, both of which are determined from the radar data, the position and the velocity of the vehicle are determined at any time during the exposure through linkage with available road information. The aspect angle is then determined from the positions of the sensor and of the vehicle as well as from the direction of movement of the vehicle. The required road information can be acquired from digital maps or images (e.g. aerial photographs, SAR-images).

2 Claims, 2 Drawing Sheets

(56) References Cited

OTHER PUBLICATIONS

P. Berens et al., "Detection of Curving Ground Vehicles in Radar Data for ISAR Imaging", EUSAR, Jun. 2, 2008, XP009136014 (Four (4) pages).
M. Martorella, "Performance Analysis of an ISAR Contrast-Based Autofocusing Algorithm Using Real Data", IEEE, Sep. 3, 2003, pp. 30-35, XP010688672.

Stephen Simmons, "A New Approach to Motion Estimation for ISAR Imaging", IEEE, Apr. 19, 1994, pp. V-201-V-204, XP010133735.
Berizzi Fabrizio et al., "Autofocusing of Inverse Synthetic Aperture Radar Images Using Contrast Optimization", IEEE Transactions on Aerospace and Electronic Systems, Jul. 1996, pp. 1185-1191, vol. 32, No. 3, XP011081035.
International Search Report dated Jul. 22, 2010 (Four (4) pages).

\* cited by examiner

METHOD AND DEVICE FOR DETERMINING ASPECT ANGLE PROGRESSION

BACKGROUND AND SUMMARY OF THE INVENTION

Modern imaging radar sensors that are air- and space-borne use the principle of "radar with synthetic aperture" (SAR) for imaging static scenes. Furthermore, the imaging of moving objects—e.g. vehicles—with the inverse SAR process (ISAR) is increasingly becoming the focus of requirements of radar systems used for terrestrial observation and military reconnaissance. While the movement of the vehicle appears as interference with the relative movement between the radar sensor and the vehicle, with a suitable arrangement it can improve the imaging performance. In the context of a system design, an ISAR operational mode can therefore be sought that uses the movement of the vehicle to enhance performance. On this basis, the duration of an ISAR exposure can be significantly reduced in comparison with the prior art if the course of the vehicle to be imaged undergoes a continuous change in direction while it is being imaged, e.g. while traveling through a bend. This is particularly important for multi-functional monitoring radar that has to perform tasks in other modes before and after the ISAR data acquisition.

One problem of the evaluation of the ISAR data is that the necessary knowledge of the vehicle movement is generally not available or available only with insufficient precision for the image generation. The aspect angle course subject to which the radar illuminates the vehicle during the exposure and subject to which the vehicle echoes are received, plays a decisive role beside the changes in distance between the sensor and the vehicle, which can easily be estimated and compensated for. A change in the aspect angle at constant angular velocity then determines the scaling of the vehicle image perpendicularly to the radar's line of sight. A wrong assumption in this case leads to a distorted image. Furthermore, if the angular velocity is not constant, the imaging of the vehicle is out of focus, which is usually not usable.

The determination of the aspect angle course prior to the image generation therefore represents a significant problem, for which until now no satisfactory solution existed in the prior art.

It is already known from the general state of knowledge of the person skilled in the art to make the problem of the determination of the aspect angle course the responsibility of other operational modes in the case of multi-function radar. In the context of the system design, this requires that prior to performing the exposure moving vehicles are detected (MTI) and their courses are traced. Information regarding the aspect angle course during the ISAR exposure is then derived from the course of the vehicle.

This separation in time between the acquisition of the information regarding the vehicle movement and the acquisition of the ISAR radar echo inevitably gives rise to a problem if the vehicle behaves differently than expected. The predicted aspect angle course is in that case wrong and not usable. Admittedly this problem could be resolved through the operation of MTI, coursing control, and ISAR acquisition in the multiplex, but this represents a particular challenge that even the most sophisticated radar systems can satisfy only in exceptional cases.

P. Berens and J. H. G. Ender, "Motion Estimation for ISAR Imaging of Ground Moving Targets", EUSAR 2006, Dresden, May 2006 proposed compressing the echoes in the context of the ISAR processing initially in the range direction, wherein the translational movement (change in distance between sensor and vehicle) is also compensated for. The entire duration of the exposure is then divided into short intervals. Corresponding to these time intervals the data are separated into so-called azimuth segments. Subsequently, the data of these segments in the azimuth direction are transformed into the Doppler frequency range, so that a sequence of distance Doppler segments is created. The reflectivity of the vehicle appears coarsely focused therein. The aspect angle course can subsequently be determined from the course of the reflectivity distribution orientation across all the segments.

It is, however, a disadvantage that the reflectivity distribution in the distance Doppler segments itself changes greatly with the aspect angle, which leads to errors in the estimation of the aspect angle course. Furthermore, the method itself requires an initial assumption regarding the velocity with which the aspect angle changes.

German patent DE 10 2006 009 121 A1 only discloses estimating two parameters for vehicles that travel at constant velocity, instead of determining the aspect angle course, and to facilitate the image generation with these. While the determination of the two required focusing parameters can take place in a very simple manner with this established method, it is unfortunately not usable for the determination of aspect angle progressions at non-constant angular velocity, as often occurs in practice.

Exemplary embodiments of the present invention determine for ISAR processing, from acquired ISAR data of a vehicle moving along a road and from information regarding the course of the road, the true aspect angle course, subject to which the radar illuminates the vehicle during the exposure and subject to which the vehicle echoes are reflected and received by the radar, with a method that is generally usable compared with the prior art.

According to exemplary embodiments of the present invention, the aspect angle course subject to which the radar illuminates a vehicle during the exposure and subject to which the vehicle reflects the echoes that are then received by the radar sensor is determined. Assuming the premise that the radar data alone are not sufficient for a robust determination of the aspect angle course, additional knowledge of the course of the road is used, subject to the assumption that the vehicle to be imaged is travelling on a road. Using the distance between the radar sensor and the vehicle as well as the change in distance, both of which are determined from the radar data, the position and the velocity of the vehicle are determined at any time during the exposure through the linkage with available road information. In so doing, one finds a location of the road whose distance from the sensor agrees with the measured distance of the vehicle as the vehicle position is obtained. Building further on the position, the vehicle velocity is then determined by projecting the velocity in the radar's line of sight onto the road direction at the determined vehicle position.

The aspect angle is then determined from the positions of the sensor and the vehicle as well as the direction of movement of the vehicle that corresponds to the direction of the vehicle's longitudinal axis.

Required road information can be acquired from digital maps or images (e.g. aerial photographs, SAR images).

As an advantage in comparison with previously known approaches, the aspect angle course is determined in the present invention from the actual acquired ISAR data. The otherwise unavoidable separation in time between the aspect angle determination and the ISAR data acquisition is thereby omitted and the determined aspect angle course reflects the actual geometric relations during the exposure. The aspect angle determination is advantageously no longer based on the orientation of the reflectivity distribution in the range-Doppler segments, but instead evaluates just the position of the radiometric centroid in distance and Doppler within the scope of the movement compensation, which takes place prior to the estimation of the actual aspect angle.

The applicability of the solution according to the invention is not limited to vehicles with a constant velocity.

The aspect angle course, subject to which the radar illuminates the vehicle, can thereby be determined for vehicles that travel on known roads or roads. Consideration of the method provides a sharp, undistorted image of the vehicle in the context of the generation of ISAR images. Furthermore, the road information can be used to take ISAR images specifically in areas in which vehicles are expected with motions that are suitable for ISAR.

The invention is explained in detail below with reference to the drawings.

BRIEF DESCRIPTION OF THE DRAWING FIGURES

DETAILED DESCRIPTION

Figure 1:
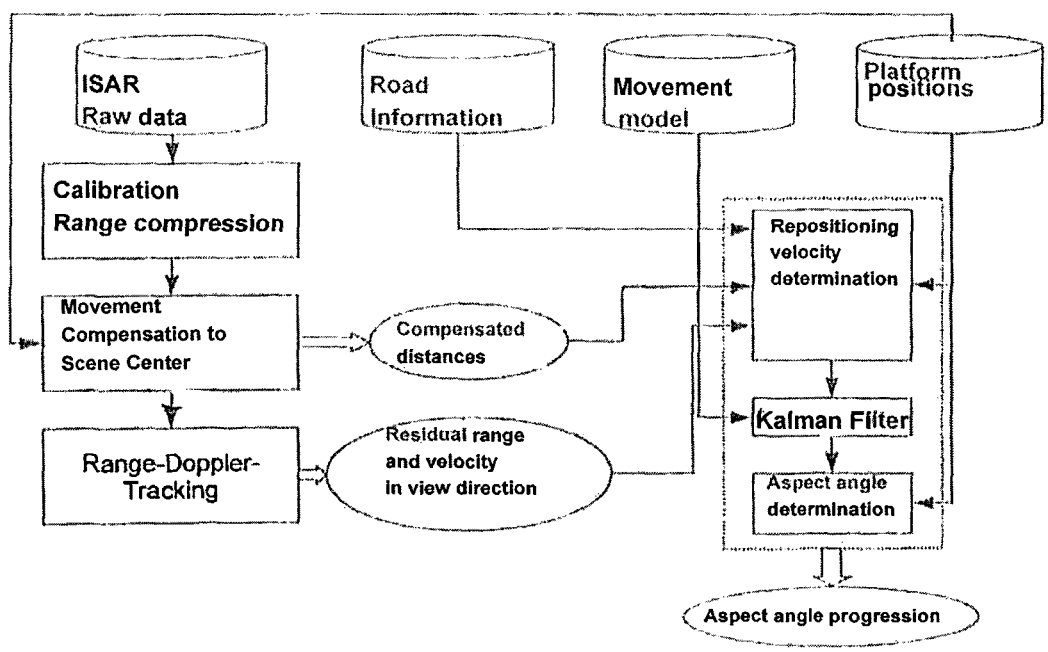
FIG. 1 is a flowchart of the method according to the invention.

The new method, represented in FIG. 1, determines the aspect angle course, subject to which the radar illuminates the vehicle during the exposure and subject to which the vehicle echoes are reflected back to the radar.

For this purpose, the course of the distance between the radar sensor and the vehicle, which is determined from the acquired ISAR data itself, is linked with the course of the road.

In a first step of the method, road information for a planned deployment area of the ISAR that is to be used is determined from verified data collections, digital maps and/or aerial photographs. Since the device that is necessary for the execution of the method is preferably to be controlled by means of a program, these geodesic data should be converted into a format suitable for the method. For this purpose, points on the course of the road are determined in a local 3-dimensional Cartesian coordinate system and written as road information into a data memory, so as to be available for the following method steps. The missing intermediate points can be determined through interpolation if the geodesic data are available in sufficient density.

A course of the road is illuminated by an ISAR; the ISAR raw data recorded in the process are calibrated directly and compressed in the range direction. Then the course of the distance between the sensor and the centre of the scene, which is caused by the sensor movement, is compensated for on the basis of the compressed echoes in the context of the movement compensation.

If, in addition, prior information regarding the movement of the vehicle is available, e.g. from moving target detection and coursing control that was performed in advance, then this should also be considered in the context of the movement compensation. Compensated distances are stored for later usage.

Short azimuth-data segments have to be first transformed into the Doppler frequency range in the context of the range-Doppler-tracking, as a result of which a sequence of residual range-Doppler images are created. The moving vehicle can then be localized in the residual range-Doppler images, which is particularly successful if the vehicle's velocity is such that it appears in a Doppler range that is not covered by the echoes of the scene (clutter)—this case would correspond to an exo-clutter target. If, in contrast, the vehicle is in the clutter (endo-clutter target) during this method step, the clutter has to be suppressed. The vehicle is subsequently tracked further in the residual range-Doppler sequence. With the aid of the radiometric centroid a residual range value and a Doppler value is determined here for every residual range-Doppler segment.

From the determined course of the vehicle position in the Doppler, the residual velocity progression is then specified, which is the basis for resolving ambiguities in the Doppler values. Subsequently, a residual velocity profile is likewise determined from the course of the unambiguous Doppler values. This residual velocity progression and the residual range in the viewing direction are kept available for subsequent processing steps.

The residual range progression and the residual velocity progression represent values based on the previous method step of the compensation of the sensor movement. In the context of the repositioning and the determination of velocity, the original distance and velocity progressions between the sensor and the vehicle in the viewing direction are initially determined using the correction of the residual progressions corresponding to the compensated distances. From the course of the vehicle position, the determined course of the distance as well as the road information, the positions on the road on which the vehicle was located at the corresponding times are then determined. Finally, on the basis of the resulting vehicle positions, the determined velocity progression in the viewing direction is projected in the direction of the road, which yields the associated velocity vectors for the vehicle. The viewing direction is determined thereby from the platform position and the determined vehicle position. This approach yields the progressions of the vehicle position and of the vectorial vehicle velocity.

Figure 2:
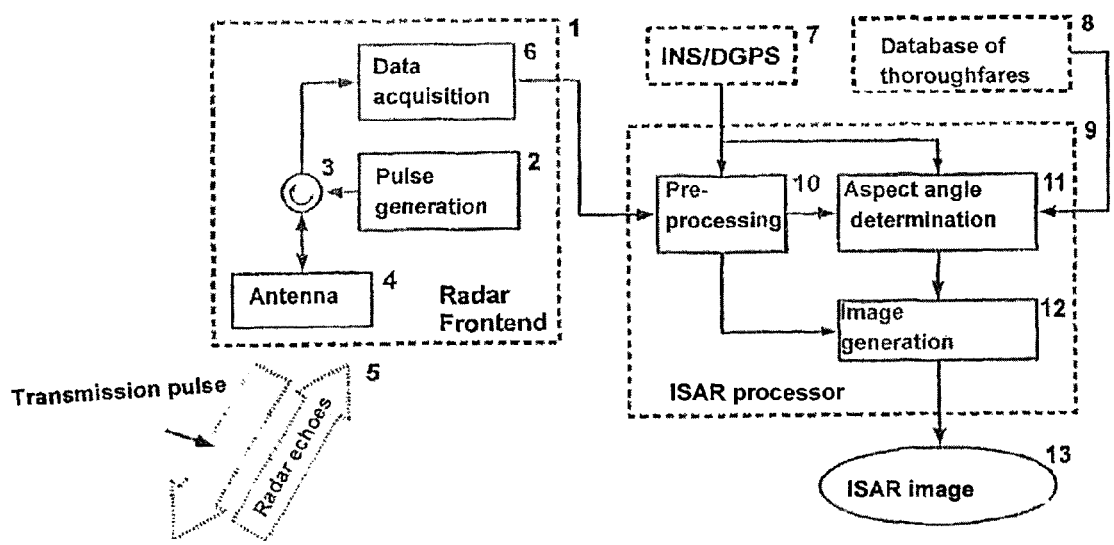
FIG. 2 is a block circuit diagram of an ISAR system with a device for determining the aspect angle course.

The positions and velocities determined by these means have to be consolidated with the movement model of the vehicle using a suitable algorithm (e.g. a Kalman filter). The positions and velocities serve as measurement values for the correction of the values propagated using the movement model. Weighted according to their accuracy, the contributions from model and measurement values enter into the result. By these means, position, velocity, and acceleration are ultimately determined at the desired times with an accuracy that is not achievable otherwise. The aspect angle calculation now follows from the course of the travel direction (direction of the velocity vector) as well as the positions of the radar sensor and the vehicle. The resulting aspect angle course is then available for ISAR processing. Using the method of the present invention, an aircraft- or satellite-borne ISAR system can be constructed according to FIG. 2, by means of which vehicles that travel on known thoroughfares can be imaged with high resolution.

Such a system requires a radar front-end 1, a unit for the acquisition of sensor movement (i.e., an inertial navigation system/differential global positioning satellite (INS/DGPS)) 7, a database of thoroughfares that provides road information 8, as well as an ISAR processor 9.

In the radar front-end 1, high-frequency transmission pulses of large bandwidth are generated in a pulse generator unit 2 and are fed to an aligned antenna 4 via a circulator 3. The antenna 4 illuminates a scene with the generated pulses on the ground where a vehicle moves along a road and it receives the reflected echoes 5 of the scene. The circulator conducts the received signals to a data acquisition unit 6 that performs, besides signal amplification and frequency shifting, in particular the digitization and storage of the data.

The ISAR processor processes the recorded echoes in such a manner that initially a unit for pre-processing 10 implements essential steps. Here the data are calibrated and compressed in the range direction. Furthermore, movement compensation regarding the scene center takes place taking the sensor course into account that was measured with the INS/DGPS-unit 7. If prior information regarding the movement of the vehicle is known, it is taken into account in the context of the movement compensation. In order to determine residual ranges and velocities, the vehicle is progressed further in the distance-Doppler-range. The unit for aspect angle determination 11 combines the previously determined progressions of the residual range and the velocity from the pre-processing 10 with the platform positions measured by the INS/DGPS-unit 7 as well as the road information from the database of thoroughfares 8. The determination of the aspect angle takes place here according to the previously described method. The compressed and movement-compensated echoes of the pre-processing means 10 are subsequently further processed in the image generation unit 12 to form an ISAR image 13, taking into account the determined aspect angle course.

The methods and techniques disclosed herein can be performed using a computer program stored on a non-transitory storage medium, which when executed by a processor, causes the processor to perform, or control the performance, of the disclosed methods and techniques.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Front end of the ISAR System
2 Unit for generating HF-transmission pulses
3 Circulator
4 Antenna for transmitting and receiving
5 Transmission and receiving signals
6 Unit for the acquisition of the received signals
7 Unit for determining the platform position and orientation on the basis of ISN and DGPS
8 Database with information regarding road progressions
9 ISAR processor for the calculation of radar images of moving vehicles
10 Unit for pre-processing
11 Unit for the determination of the aspect angle
12 Unit for the calculation of the ISAR image
13 The resulting ISAR image of the vehicle

The invention claimed is:

1. A method for determining the progression of an aspect angle, the method comprising:
    illuminating, by an aircraft- or satellite-borne Inverse Synthetic Aperture RADAR (ISAR), a vehicle traveling on a road;
    receiving, by a radar sensor, echoes reflected back from the vehicle to the radar, wherein the radar signals themselves are used for determining the aspect angle;
    determining, by an ISAR processor, distances and changes in distance between the radar sensor and the vehicle and between the radar sensor and a thoroughfare;
    determining, by the ISAR processor, positions of the vehicle for every point in time during an exposure of the vehicle by the radar using the determined distance, change in distance, and road information obtained from a database of thoroughfares in an area illuminated by the radar;
    determining, by the ISAR processor, velocity vectors of the vehicle at the determined positions of the vehicle using geometric conversions;
    combining, by the ISAR processor using a mathematical process, the determined positions of the vehicle, the determined velocity vectors of the vehicle and a movement model of the vehicle, wherein contributions from the movement model and the determined positions of the vehicle and determined velocity vectors of the vehicle are weighted according to their accuracy;
    determining, by the ISAR processor using a geometric calculation, an aspect angle of the illumination of the vehicle for each moment of the exposure from a viewing direction between radar sensor and vehicle, wherein the viewing direction is a direction of a connecting line from the radar sensor to the vehicle that results from positions of the sensor and the vehicle and the direction of the velocity vector of the vehicle whose direction coincides with the vehicle longitudinal axis.

2. A non-transitory storage medium that includes a computer program, which when executed by a processor causes the processor to:
    illuminate, by an aircraft- or satellite-borne Inverse Synthetic Aperture RADAR (ISAR), a vehicle traveling on a road;
    receive, by a radar sensor, echoes reflected back from the vehicle to the radar, wherein the radar signals themselves are used for determining the aspect angle;
    determine distances and changes in distance between the radar sensor and the vehicle and between the radar sensor and a thoroughfare;
    determine positions of the vehicle for every point in time during an exposure of the vehicle by the radar using the determined distance, change in distance, and road information obtained from a database of thoroughfares in an area illuminated by the radar;
    determine velocity vectors of the vehicle at the determined positions of the vehicle using geometric conversions;
    combine, using a mathematical process, the determined positions of the vehicle, the determined velocity vectors of the vehicle and a movement model of the vehicle, wherein contributions from the movement model and the determined positions of the vehicle and determined velocity vectors of the vehicle are weighted according to their accuracy;
    determine, using a geometric calculation, an aspect angle of the illumination of the vehicle for each moment of the exposure from a viewing direction between radar sensor and vehicle, wherein the viewing direction is a direction of a connecting line from the radar sensor to the vehicle that results from positions of the sensor and the vehicle and the direction of the velocity vector of the vehicle whose direction coincides with the vehicle longitudinal axis.

* * * * *